Patented Jan. 15, 1924.

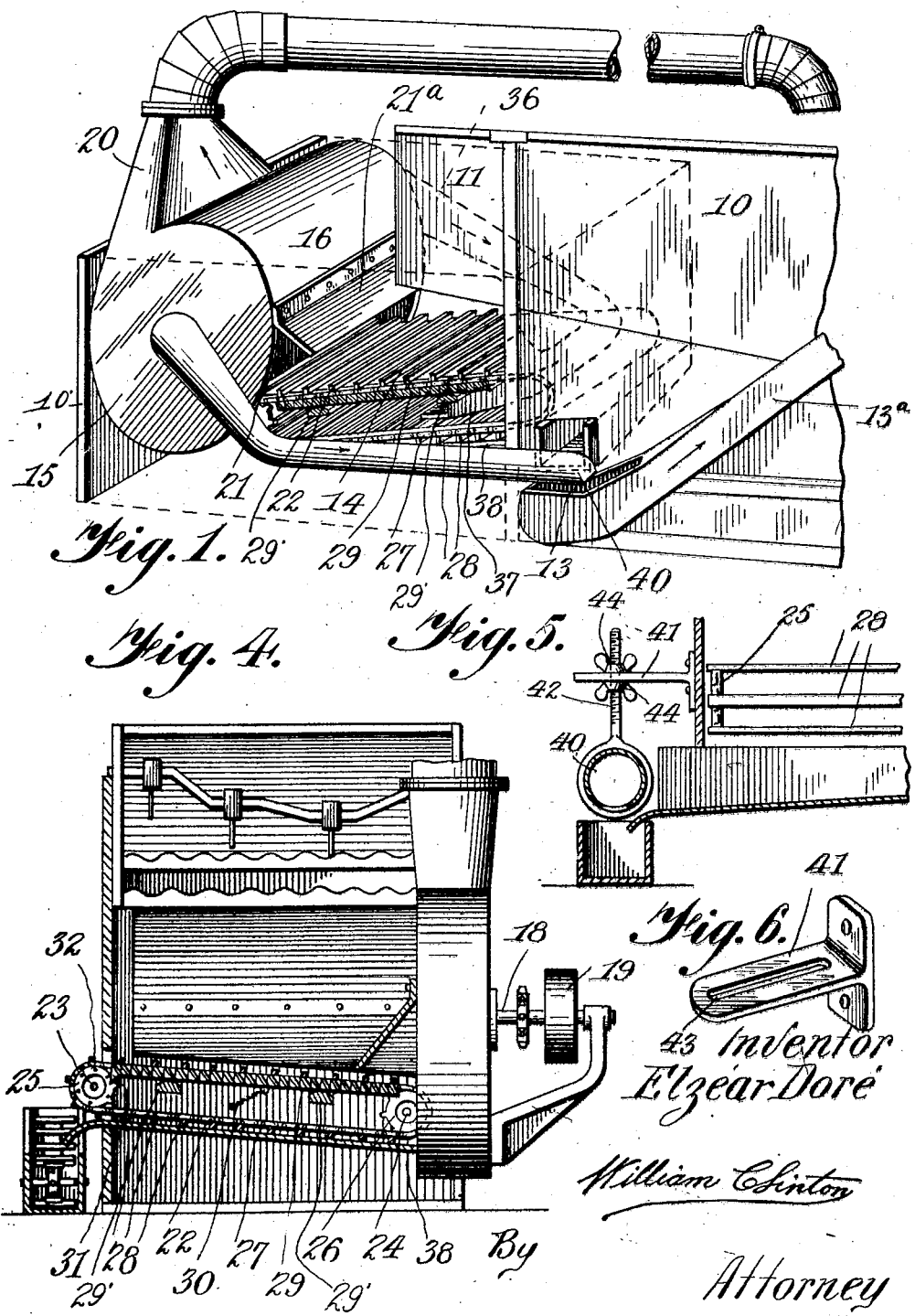
Jan. 15, 1924.  
E. DORÉ  
ATTACHMENT FOR THRASHING MACHINES  
Filed Jan. 27, 1921  
1,480,548  
3 Sheets-Sheet 1

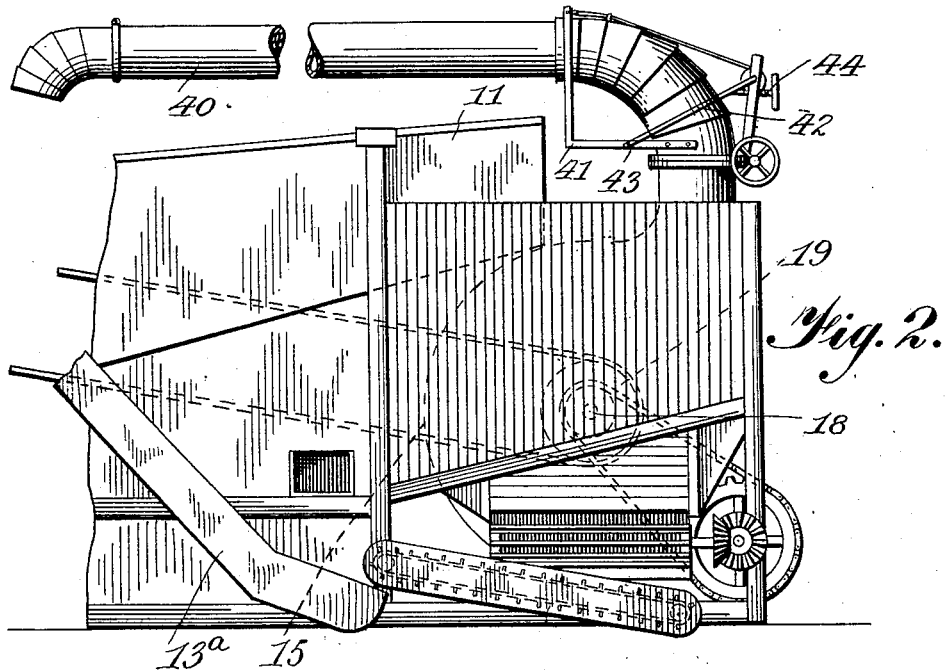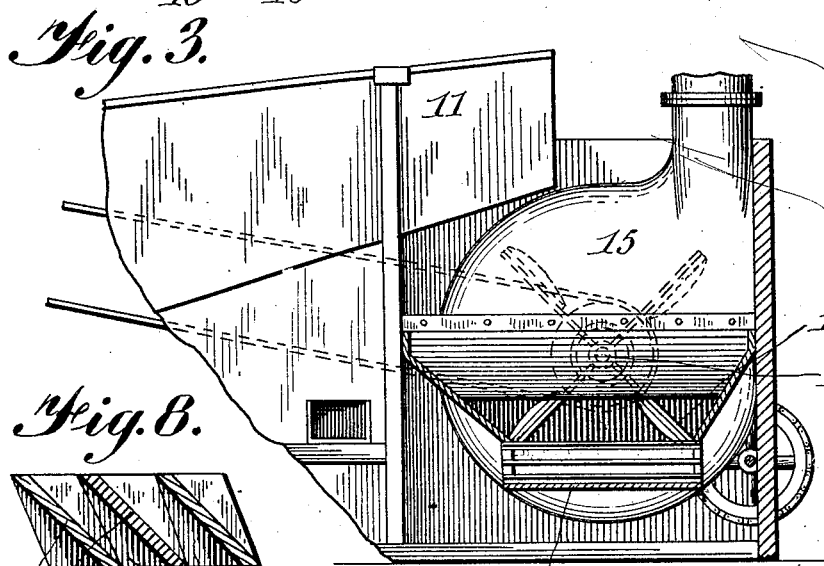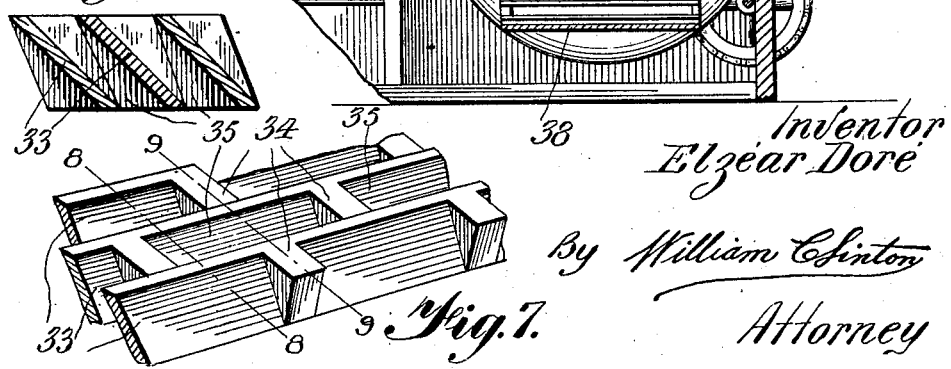

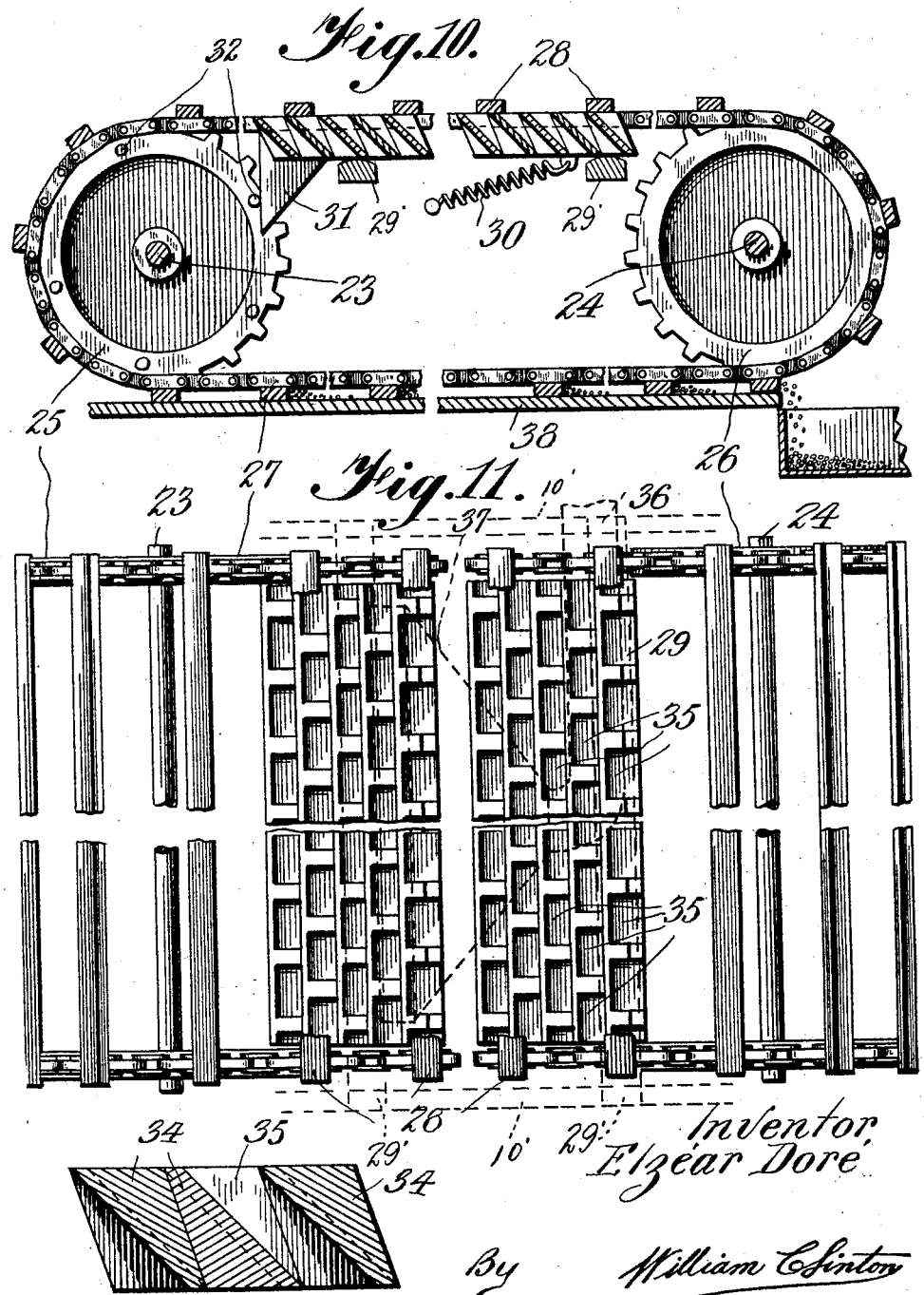

1,480,548

UNITED STATES PATENT OFFICE.

ELZEAR DORÉ, OF LAPRAIRIE, QUEBEC, CANADA.

ATTACHMENT FOR THRASHING MACHINES.

Application filed January 27, 1921. Serial No. 440,435.

*To all whom it may concern:*

Be it known that I, ELZEAR DORÉ, a subject of the King of Great Britain, residing at Laprairie, Province of Quebec, Canada, have invented certain new and useful Improvements in Attachments for Thrashing Machines; and I do hereby declare that the following is a full, clear, and exact description of the invention, such as will enable others skilled in the art to which it appertains to make and use the same.

The present invention relates to new and useful improvements in a blower and conveyor attachment for grain thrashing machines.

The primary object of the invention is the provision of a blower and conveyor attachment for grain thrashing machines so constructed that it will separate any grain from the straw which is discharged from the thrashing machine.

Another object of the invention is the provision of an attachment such as above described for thrashing machines and the like, so constructed and designed that it can be used for stacking the straw at any desired location adjacent the machine and also separating any grain which remains with the said straw and is ordinarily discharged from the thrashing machine and wasted.

Another object of the invention is the provision of a thrashing machine such as above referred to, including a blower for discharging the straw to be stacked in any desired location, together with a conveyor for passing the straw from the thrashing machine to the blower, and during such operation separating any grain which remains with the straw therefrom, and returning it to the thrashing machine.

A still further object of the invention is the provision of a machine such as above referred to, which will be comparatively simple and inexpensive to manufacture, reliable and efficient in use, and readily operated.

With the above and other objects in view, the present invention resides in the novel features of construction, formations, combinations, and arrangements of parts to be hereinafter more fully described, claimed, and illustrated in the accompanying drawings forming a part of the present application; and in which, Figure 1 is a perspective view of the attachment shown in connection with a portion of a thrashing machine;

Figure 2 is a view showing a slightly modified form of the invention;

Figure 3 is a longitudinal sectional view taken through the machine illustrated in Figure 2;

Figure 4 is a transverse sectional view thereof;

Figure 5 is a detail sectional view illustrating the means of supporting one of the blower tubes;

Figure 6 is a detail perspective view of the supporting bracket;

Figure 7 is a detail perspective view of a portion of the grill or sieve;

Figure 8 is a detail sectional view taken on the line 8—8 of Figure 7;

Figure 9 is a similar view taken on the line 9—9 of Figure 7;

Figure 10 is a longitudinal sectional view taken through the conveyor; and,

Figure 11 is a plan view thereof.

Referring now to the accompanying drawings by corresponding characters of reference throughout the several views the numeral 10 designates in general a portion of a thrashing machine which is provided with the usual straw discharge end 11, from which the straw is discharged into the housing 10' and upon my improved attachment shown at 14 comprising a conveyor, the upper lap of which carries the said straw to the blower 15 while the lower cap carries the grain falling therefrom to the tailing hopper 13, which leads to the elevator, 13ª.

My improved attachment, which is shown at 14, comprises the blower 15 including the casing 16 in which is mounted the usual fan blade 17, the latter being keyed to the shaft 18 which is driven by a pulley 19.

The discharge spout 20 leads from the casing 16 of the blower in the usual manner and through this spout straw or the like may be blown to the stack.

The lower side of the casing 16 is provided with an opening 21 through which the straw may be fed by means of the conveyor 22, and a plate 21ª is secured above the opening 21 to throw the straw upon the conveyor. This conveyor 22 comprises a pair of shafts 23 and 24 to which are keyed at their opposite ends sprocket wheels 25 and 26 which engage and support the endless chains 27.

These chains 27 upon opposite sides of the conveyor are connected by slats 28 which comprise the said conveyor.

It will thus be seen that the straw which is discharged from the discharge end 11 of the thrashing machine 10, will be deposited on the upper side of the conveyor and will be carried by these said slats towards the casing 16 in which it passes through the openings 21 as above mentioned.

A grill or sieve 29 is mounted beneath the upper lap of the conveyor 22 preferably extending practically the entire length thereof and is of substantially rectangular formation, being mounted either rigidly or for vibratory movement and being drawn in a given direction by means of a spring 30 as conditions might require. The grill 29 is supported upon slats 29' mounted in the side walls of the housing 10'.

A cam projection 31 extends from each side of the grill at the outer end thereof and is adapted to engage the series of pins 32 carried by each of the sprockets 25.

Obviously upon the rotation of these sprockets, the pins 32 strike the cam projections 31 causing a vibratory motion to be imparted to the grill or sieve as above mentioned.

The grill or sieve 29 comprises a plurality of angularly disposed bars 33 provided with stepped spacing ribs 34 which constitute a series of pockets 35 open at their lower ends, as shown, to allow the grain to fall therethrough and to be carried to the tailing hopper by the slats 28 of the lower lap of the conveyor 22.

A blast pipe 36 extends from the blower 15 to a point adjacent the inner end of the grill or sieve 29 at which point it is provided with a nozzle 37 adapted to direct a blast of air beneath the grill or sieve which blast is directed upwardly through the pockets 35 and into engagement with the straw passing thereover and carried by the upper lap of the conveyor.

This blast of air obviously separates the straws, partially raising the same and causing the grain to fall therethrough upon the plate 38 positioned below the lower lap of the conveyor from whence the said grain will be directed by means of the said slats 28 which pass over the plate into the tailing hopper 13. This arrangement of parts is clearly shown in Figure 3 of the drawings.

From the tailing hopper the grain may be carried into the thrashing machine for separation into grades by the elevator 13ª.

If desired, the blast pipe 36 may be operated from any suitable source and not from the blower 15 as shown in Figure 1.

As shown in Figure 1, a suction pipe 40 leads from the blower 15 to the tailing hopper or spout, serving to suck any light particles of straw, chaff or the like from the grain prior to its passage into the thrashing machine above referred to. This pipe 40 may be adjustably held in the bracket 41 by means of the rod 42 which passes through the slot 43 in the said bracket 41 and which is adjustable through the winged nuts 44.

If desired the grill or sieve may be made adjustable and the bars 33 set at various angles to provide for more efficient operation in connection with various grades.

From the foregoing description, taken in connection with the accompanying drawings, it will be manifest that an attachment for thrashing machines of the class described is provided, which will fulfil all of the necessary requirements of such a device, and it should be understood in this connection, that various minor changes in the specific details of construction can be resorted to within the scope of the appended claims, without departing from the spirit or sacrificing any of the advantages of the invention.

Having thus fully described the invention, what I claim as new and desire to protect by Letters Patent is:—

1. An attachment for a thrashing machine comprising an endless conveyor adapted for communication with the discharge end of the machine, a reciprocable sieve disposed within said conveyor for cooperation therewith, a blower adapted to draw from the upper lap of the conveyor, and means for directing a blast of air to the underside of the sieve.

2. An attachment for a thrashing machine comprising an endless conveyor adapted for communication with the discharge end of the machine, a reciprocable sieve disposed within said conveyor for cooperation therewith, a plate mounted beneath the lower lap of the conveyor, a tailing hopper at one end of said plate and adapted to receive therefrom, a sieve mounted beneath the upper lap of the conveyor, means for reciprocating said sieve, and means for directing a blast of air beneath and through said sieve for raising straw from the upper lap of the conveyor and permitting grain contained in said straw to fall through the sieve upon the plate.

In witness whereof I have hereunto set my hand.

ELZEAR DORÉ.